Patented Nov. 10, 1936

2,060,597

UNITED STATES PATENT OFFICE 2,060,597

METHOD FOR THE PRODUCTION OF TERPINEOL FROM PINENE

Donald H. Sheffield, Brunswick, Ga., assignor to Hercules Powder Company, Wilmington, Del., a corporation of Delaware No Drawing. Application January 9, 1935, Serial No. 1,021

13 Claims. (Cl. 260—153)

This invention relates to a method for the production of terpineol from pinene.

Terpineol has heretofore been produced from pinene by a method involving the treatment of pinene with very strong or anhydrous formic acid in the presence of a small quantity of sulphuric acid to effect the production of terpinyl formate, the sulphuric acid acting to catalyze reaction between the pinene and the formic acid. The terpinyl formate formed was then hydrolyzed by treatment with an aqueous or alcoholic caustic solution with the production of a mixture of alkali formate and mixed alpha- and beta-terpineol in which alpha-terpineol predominated. The terpineols were readily separated from the alkali formate and water or alcohol. However, for recovery of the formic acid, it was necessary to treat the alkali formate, produced as a by-product, with a strong acid with final recovery of the formic acid by distillation.

The method for the production of terpineol from pinene heretofore known is entirely impractical for the commercial production of terpineols, as alpha-terpineol, because of the high cost involved in the recovery of the very strong or anhydrous formic acid used. Obviously, the process is of no practical value whatever from the economic standpoint unless the formic acid is largely recovered.

Now, in accordance with this invention there is provided a process whereby terpineol may be produced from pinene as such, or from pinene in solution in a solvent or mixture of solvents, which will be inert in the reaction involved. The method in accordance with this invention will be found distinctly advantageous over the prior method for the production of terpineol from pinene from the standpoints of great economy, high yield and simplicity of procedure.

More particularly, the method in accordance with this invention involves the treatment of pinene alone, or dissolved in an inert solvent or solvent mixture, with a mixture of phosphoric and formic acids. Still more particularly, the total acidity of the mixture of phosphoric and formic acid will range from about 60% to about 75%, and desirably the phosphoric acid content of the mixture will range between about 20% and about 40%, by weight, of the formic acid contained.

In carrying out the method in accordance with this invention the pinene, alone or in solution in an inert solvent, and the acid mixture will desirably be agitated and during the treatment the reaction mass will desirably be maintained at a temperature below about 50° C.

On completion, or substantial completion, of the reaction between the pinene or pinene solution and the mixture of phosphoric and formic acids, agitation will be stopped and the acids allowed to separate in a layer and drained off for reuse in the treatment of a further quantity of pinene. The oily layer remaining will then be freed of any dissolved formic acid, for example, by distillation in vacuo after an addition of water and agitation.

In procedure in accordance with this invention but a small percentage of terpinyl formate will remain in the oil and may readily be removed from the oils, for example, after removal of dissolved formic acid, by saponification through the addition to the oils of a caustic solution and draining off caustic solution after separation.

The acid mixture, dissolved formic acid and the formic acid produced by saponification of any small percentage of terpinyl formate present having been removed, the oil will be fractionated for the recovery of terpineol.

In the procedure in accordance with the method embodying this invention, it will be noted that a mixture of formic acid containing a relative large percentage of phosphoric acid, the mixture being of a relatively low acidity, is substituted for the highly concentrated or anhydrous formic acid and very small percentage of sulphuric acid used by the prior art. In accordance with the method embodying this invention the phosphoric acid catalyzes the reaction between the formic acid and the pinene and subsequently hydrolyzes the resulting terpinyl formate to produce alpha-terpineol and formic acid.

In the practical adaptation of the method in accordance with this invention, as has been indicated, pinene as such, for example, alpha-pinene, may be treated, or, alternatively, pinene in solution in an inert solvent or solvent mixture may be treated. For example, the pinene may be treated in solution in a mixture of paramenthane and other terpenes, the mixture containing a trace of solvent naphtha, or in solution in solvent naphtha containing a larger or smaller percentage of other terpenes. Again, the pinene may be treated in solution in dipentene, as, for example, as found in turpentine.

As has been indicated, the phosphoric acid content of the mixture of phosphoric and formic acids may range between about 20% and 40% by weight of the formic acid contained. A mixture containing about 1 part by weight of phosphoric acid to 3 parts by weight of formic acid will be found satisfactory. While the acidity of the mixture of acids may, as has been indicated, range between about 60% and 75%, generally speaking an acidity of about 70% will be found satisfactory. While, as has been indicated, it will generally be desirable to maintain a temperature during the reaction not in excess of about 50° C., generally speaking a temperature of about 35° C. will be found satisfactory.

Having now indicated in a general way the nature and purpose of this invention, I will proceed to a more detailed disclosure thereof with reference to various examples of the practical adaptation of the invention to the production of terpineol from pinene alone and from pinene in solution in a solvent and in solvent mixtures.

As illustrative of the production of terpineol from pinene alone, for example, to 2000 grams of alpha-pinene (sp. gr. 0.8621 at 15.5° C.) are added an acid mixture comprising 1200 grams of 70% formic acid and 400 grams of 70% phosphoric acid The reagents are stirred and suitably cooled to maintain the temperature below about 45° C. for a period of about eight hours. The acid mixture is then permitted to separate as a lower layer beneath the oil and is drawn off. About 75% of the total acid used, including practically all of the phosphoric acid, will be thus separated and recovered.

After drawing off the separated acid mixture 200 grams of water are added to the oil, the amount of water being approximately the amount given up by the dilute acid for hydration of the pinene, the oil and water are agitated and the resulting mixture distilled in vacuo (100 mm. mercury) for the removal of the dilute acid remaining in the oil. A dilute acid of approximately 50% strength will be thus recovered and in such quantity to bring the total acid recovered to about 95% of that used and when added to the acid mixture drawn off, to bring the strength of the total acid recovered to about 70%. It will be noted that the recovered acid will include phosphoric and formic acids in about the original proportion and of about the original acidity. Thus, the recovered acids may be reused for the treatment of further pinene.

The oil remaining after the recovery of the acid mixture will contain a small percentage of terpinyl formate, for the saponification of which the oil will be treated with, for example, a 20% solution of caustic soda containing about 80 grams of caustic. The caustic solution will be agitated with the oil and saponification of the terpinyl formate will result. After settlement the caustic solution will be drained off.

The oil will then be fractionated and will yield the following fractions:

|   |   | Grams | Per cent |
|---|---|---|---|
| 1. | Dipentene-terpinene cut | 660 | 30 |
| 2. | Terpineol | 1400 | 63.6 |
| 3. | Residue | 145 | 6.4 |
|   | Total | 2205 | 100.0 |

It will be noted that the weight of oils obtained is greater than the amount of pinene originally treated. The additional weight will be due to the amount of water added in hydrating. The terpineol cut will be a mixture of alpha- and beta-terpineol containing a total of 95%-99% tertiary alcohols. On the pinene basis the yield of terpineol will be noted to be about 70%.

As illustrative of the production of terpineol from pinene in solution in a solvent, for example, to 2000 grams of turpentine, containing about 20% of dipentene, is added 1000 grams of a mixture comprising 70% formic acid and 300 grams of 70% phosphoric acid. The acid mixture and turpentine are agitated together and a temperature of less than about 45° C. is maintained for a period of about eight hours. The acid mixture is allowed to settle and drained off. Then 150 grams of water are added to the oil for the removal, by distillation in vacuo, of dissolved formic acid, and the oils are then treated with a 25% caustic solution containing 80 grams of caustic for saponification of any terpinyl formate present. The acid recovery will amount to 96% and on fractionation of the oil the following fractions will be recovered:

|   |   | Grams | Per cent |
|---|---|---|---|
| 1. | Dipentene-terpinene cut | 860 | 40 |
| 2. | Terpineol | 1180 | 55 |
| 3. | Residue (consisting mainly of terpin) | 105 | 5 |
|   | Total | 2145 | 100 |

As illustrative of the practical adaptation of the method in accordance with this invention for the production of terpineol from pinene in solution in a mixture of solvents comprising, for example, 50% alpha-pinene, 20% paramenthane, 25-30% unidentified terpenes and a trace of solvent naphtha, for example, 2000 grams of the solution indicated and a mixture comprising 800 grams of 70% formic acid and 200 grams of 70% phosphoric acid are agitated at a temperature of about 40° C. for a period of six hours. The acid mixture is allowed to settle and is drawn off.

100 grams of water are then added, with agitation, and formic acid dissolved in the oil removed by distillation in vacuo. Terpinyl formate is then removed by saponification and the oil fractionated with the following yield:

|   |   | Grams | Per cent |
|---|---|---|---|
| 1. | Terpene hydrocarbon cut | 1350 | 65 |
| 2. | Terpineol | 530 | 25 |
| 3. | Residue | 210 | 10 |
|   | Total | 2090 | 100 |

The terpineol recovered will be a mixture of alpha- and beta-terpineol. The residue consists largely of terpin.

As a further example of procedure in accordance with this invention for the production of terpineol from pinene in solution in a mixture of solvents, for example, to 2000 grams of a solution comprising 65% alpha-pinene, 5% to 10% unidentified terpenes and the remainder solvent naphtha, is added a mixture comprising 300 grams of 70% phosphoric acid and 800 grams of 70% formic acid. The resultant mixture is agitated at a temperature not exceeding 50° C. for a period of eight hours. The acid mixture is allowed to separate and is drawn off. Dissolved formic acid is removed from the oil by distillation in vacuo, after the addition of 100 cc. of water, and terpinyl formate is removed as in the above examples.

The oil is finally fractionated for separation of the terpineol.

In the practical adaptation of this invention, it will be noted that the terpineol product obtained will be generally a mixture of alpha- and beta-terpineol with alpha-terpineol predominating. Generally speaking, the ratio of alpha- to beta-terpineol will increase as the ratio of formic acid to phosphoric acid decreases. The product will contain about 98% tertiary alcohols.

The method provided in accordance with this invention will be found to be highly advantageous in that the recovery of acid available for reuse will be very high and, at the same time, the formation of an alkali formate and the subsequent treatment with a strong acid, essential to acid recovery in the prior method, will be eliminated.

As will be appreciated, the method in accordance with this invention may be readily carried out in any suitable form of apparatus, it being clear that no particular form of apparatus is necessary. Thus, any vessel suitable to the containing of the acid mixture involved and provided with a stirring or agitating device and means, as, for example, a jacket, for cooling will be found satisfactory.

For the distillation involved any well known apparatus may be used or the vessel in which the primary reaction is carried out may be provided with heating means, condensing means and means for providing for vacuum for the distillation of dissolved formic acid. As will be appreciated, a plurality of vessels may be used and the acid mixture recovered from one vessel and led to another for the treatment of successive increments of pinene.

It will be appreciated that the method in accordance with this invention contemplates the production of terpineol from pinene by the treatment of pinene with a mixture of formic and phosphoric acids and more specifically contemplates procedure involving variously the details comprised in the above description of the invention.

What I claim and desire to protect by Letters Patent is:

1. The method of producing terpineol from pinene which includes treating pinene with a mixture of formic acid and phosphoric acid having a total acidity not in excess of 75% and containing phosphoric acid in amount of from about 20% to about 40% by weight of the formic acid present, whereby terpineol is produced directly as the major reaction product.

2. The method of producing terpineol from pinene which includes treating pinene at a temperature not in excess of 50° C. with a mixture of formic acid and phosphoric acid having a total acidity not in excess of 75% and containing phosphoric acid in amount of from about 20% to about 40% by weight of the formic acid present, whereby terpineol is produced directly as the major reaction product.

3. The method of producing terpineol from pinene which includes treating pinene with a mixture of formic acid and phosphoric acid having a total acidity of from about 60% to about 75% and containing phosphoric acid in amount of from about 20% to about 40% by weight of the formic acid present, whereby terpineol is produced directly as the major reaction product.

4. The method of producing terpineol from pinene which includes treating pinene at a temperature not in excess of 50° C. with a mixture of formic acid and phosphoric acid having a total acidity of from about 60% to about 75% and containing phosphoric acid in amount of from about 20% to about 40% by weight of the formic acid present, whereby terpineol is produced directly as the major product.

5. The method of producing terpineol from pinene which includes treating pinene at a temperature of from about 35° C. to about 50° C. with a mixture of formic acid and phosphoric acid having a total acidity of from about 60% to about 75% and containing phosphoric acid in amount of from about 20% to about 40% by weight of the formic acid present, whereby terpineol is produced directly as the major reaction product.

6. The method of producing terpineol from pinene which includes treating pinene with a mixture of formic acid and phosphoric acid having a total acidity of from about 60% to about 75% and containing phosphoric acid in amount of from about 20% to about 40% by weight of the formic acid present, separating the acid mixture from the oil produced and fractionating the oil to recover terpineol.

7. The method of producing terpineol from pinene which includes treating pinene with a mixture of formic acid and phosphoric acid having a total acidity of from about 60% to about 75% and containing phosphoric acid in amount of from about 20% to about 40% by weight of the formic acid present, permitting gravital separation of the acid mixture and the oil produced, removing the separated acid mixture, adding water to the oil, distilling in vacuo for the removal of water and dissolved acid from the oil, saponifying terpinyl formate present in the oil and fractionating the oil to recover terpineol.

8. The method of producing terpineol from pinene which includes treating a solution of pinene in an inert solvent with a mixture of phosphoric acid and formic acid having a total acidity of from about 60% to about 75% and containing phosphoric acid in amount of from about 20% to about 40% by weight of the formic acid present, whereby terpineol is produced directly as the major reaction product.

9. The method of producing terpineol from pinene which includes treating a solution of pinene dissolved in another terpene with a mixture of phosphoric acid and formic acid having a total acidity of from about 60% to about 75% and containing phosphoric acid in amount of from about 20% to about 40% by weight of the formic acid present, whereby terpineol is produced directly as the major reaction product.

10. The method of producing terpineol from pinene which includes treating turpentine containing pinene and dipentene with a mixture of phosphoric acid and formic acid having a total acidity of from about 60% to about 75% and containing phosphoric acid in amount of from about 20% to about 40% by weight of the formic acid present, whereby terpineol is produced directly as the major reaction product.

11. The method of producing terpineol from alpha-pinene which includes treating alpha-pinene with a mixture of formic acid and phosphoric acid having a total acidity of from about 60% to about 75% and containing phosphoric acid in amount of from about 20% to about 40% by weight of the formic acid present, whereby terpineol is produced directly as the major reaction product.

12. The method of producing terpineol from pinene which includes treating pinene with a mixture of formic acid and phosphoric acid having a total acidity of from about 60% to about 75% and containing phosphoric acid in amount of from about 20% to about 40% by weight of the formic acid present, whereby a mixture of alpha- and beta-terpineol is produced as the major reaction product.

13. The method of producing terpineol from pinene which includes treating pinene with a mixture of formic acid and phosphoric acid having a total acidity of from about 60% to about 75% and containing phosphoric acid in amount of from about 20% to about 40% by weight of the formic acid present, permitting gravital separation of the acid mixture and the oil produced, removing the separated acid mixture, adding water to the oil, distilling in vacuo for the removal of water and dissolved acid from the oil, saponifying terpinyl formate present in the oil and fractionating the oil to obtain a distillate comprising terpineol and a residue comprising terpin.

DONALD H. SHEFFIELD.